United States Patent [19]

Unewisse et al.

[11] Patent Number: 5,484,172
[45] Date of Patent: Jan. 16, 1996

[54] PIPE CONNECTION

[75] Inventors: Heinz Unewisse, Mülheim/Ruhr; Herbert Foering, Solingen, both of Germany

[73] Assignee: Mannesmann Aktiengesellschaft a Corp. of The Federal Republic of Germany, Dusseldorf, Germany

[21] Appl. No.: 864,295

[22] Filed: Apr. 6, 1992

[30] Foreign Application Priority Data

Apr. 4, 1991 [DE] Germany ............................ 9104147 U

[51] Int. Cl.⁶ .............................. F16L 55/07; F16L 19/07
[52] U.S. Cl. ...................... 285/175; 285/287; 285/382; 285/416; 285/424; 285/286; 285/915
[58] Field of Search ...................... 285/287, 382, 285/175, 424, 170, 173, 416, 405, 286, 915

[56] References Cited

U.S. PATENT DOCUMENTS

| | | | |
|---|---|---|---|
| 1,059,438 | 4/1913 | Clark | 285/287 X |
| 1,508,026 | 9/1924 | Noble . | |
| 1,758,869 | 5/1930 | Trageser et al. | 285/287 X |
| 1,936,552 | 11/1933 | Gross | 285/287 X |
| 1,941,465 | 1/1934 | Cornell, Jr. | 285/287 |
| 1,956,683 | 5/1934 | Hewitt | 285/175 X |
| 2,050,728 | 8/1936 | Ost | 285/287 |
| 2,176,470 | 10/1939 | Price | 285/287 X |
| 2,398,788 | 4/1946 | Hedrick | 285/424 X |
| 2,846,240 | 8/1958 | Beyer | 285/382 X |
| 3,149,861 | 9/1964 | Larsson | 285/382.2 X |
| 3,425,452 | 2/1969 | Shaw | 285/287 X |
| 3,498,649 | 3/1970 | Pfeuffer | 285/424 X |
| 3,997,193 | 12/1976 | Tsuda et al. | 285/175 X |
| 4,463,972 | 8/1984 | Weinhold | 285/175 |
| 4,483,514 | 11/1984 | Kennedy . | |
| 4,726,399 | 2/1988 | Miller | 285/156 X |
| 4,920,747 | 5/1990 | Haney | 285/156 X |
| 5,090,743 | 2/1992 | Obering | 285/382 |
| 5,123,439 | 6/1992 | Powers . | |

FOREIGN PATENT DOCUMENTS

| | | | |
|---|---|---|---|
| 0435070 | 9/1935 | United Kingdom | 285/287 |
| 2068070 | 8/1981 | United Kingdom | 285/93 |

OTHER PUBLICATIONS

Brochure published by Mannesmann Edelstrahlrohr GmbH—Kemper fittings—3 sheets (front & back).

Primary Examiner—Dave W. Arola
Assistant Examiner—Heather Chen Shackelford
Attorney, Agent, or Firm—Cohen, Pontani, Lieberman & Pavane

[57] ABSTRACT

A fluid conduit connection includes in combination a cast or molded connecting member; a connecting socket affixed to the connecting member and comprising a standardized sheet metal press fitting having one end thereof attached to the connecting member and comprising a substantially cylindrically portion and, at the other end thereof, an annular groove for housing a sealing member. The press fitting is dimensioned for receiving a substantially cylindrical conduit to be inserted therein and for non-releasably crimping the fitting around the conduit.

10 Claims, 1 Drawing Sheet

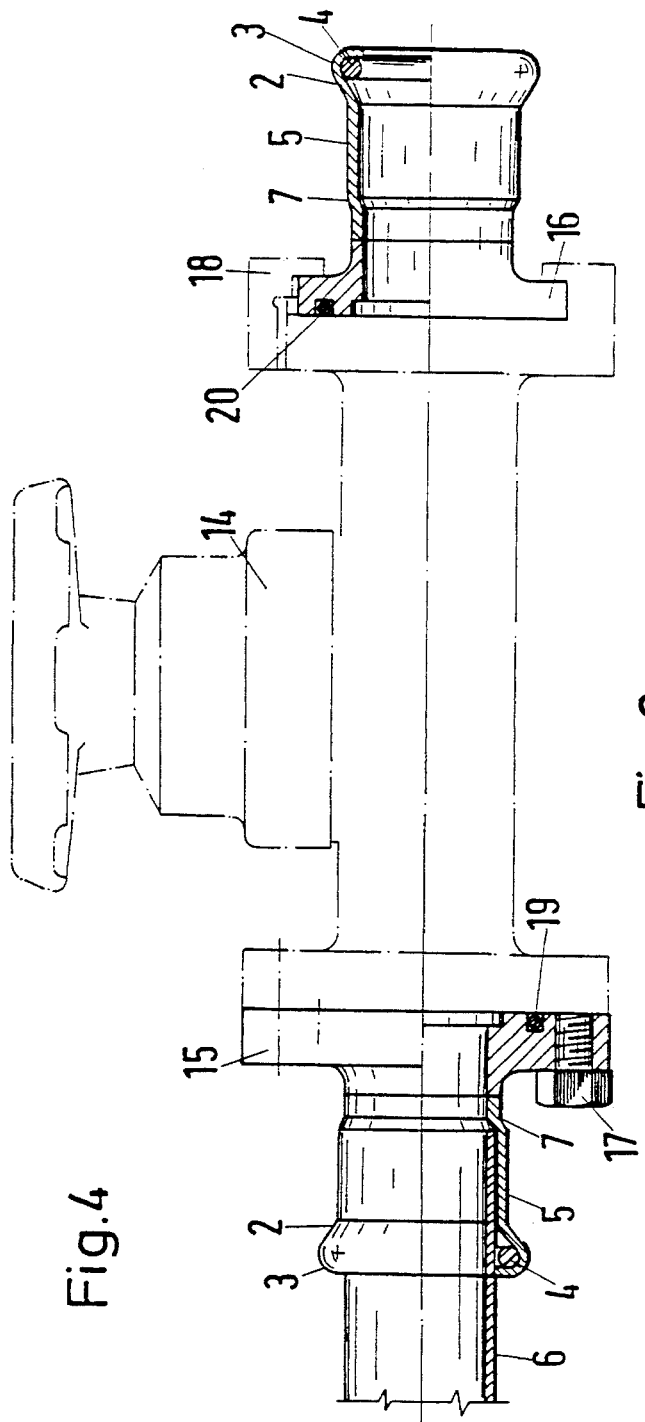

PIPE CONNECTION

FIELD OF THE INVENTION

The present invention relates to a connection of an element of a water and heating plumbing system, such as a shaped element and plumbing fixture, to a pipe and, particularly, to a connection comprising a connecting socket formed by a standardized fitting element.

BACKGROUND AND SUMMARY OF THE INVENTION

A non-detachable connecting system is known from EP 0 343 395. In that system, a connecting socket of a plumbing fixture or a cast metal fitting and a pipe which is inserted into the socket and rests against a stop are pressed together from the outside with an externally applied pressing tool (crimping). In order for this non-detachable connection to be tight, the connecting socket or coupler is provided on its outside, in the region of the end thereof, with an annular bead within which an annular packing ring or seal is arranged. As cast material, there is preferably used a red brass alloy to which 2.3% to 3% nickel is added in order to increase its elongation at rupture. The proposed alloy furthermore has a high lead content of 5% so that the dement can be readily machined. This system has the disadvantage that the composition of the alloy and the size of the dimensions of the connecting socket to be pressed together must be maintained within very narrow limits so that the pressing together or the crimping of the cast part and the pipe can be achieved without cracking. Another disadvantage of the known connecting system is that a damaged or worn fitting cannot be replaced without destroying the connecting system.

SUMMARY OF THE INVENTION

It is an object of the present invention to provide a connection of an element of the water and heating system, in particular, a shaped element and plumbing fixture, to a pipe which enables the simple, workmanlike and flawless installation into such a system even of an element made of materials which are difficult to shape. Furthermore, the connection of the present invention provides the possibility for replacing a damaged or worn plumbing fixture.

This and other objects are achieved by providing a fluid conduit connection comprising in combination a connecting member comprising an element selected from the group consisting of a cast or molded connecting element; a connecting socket affixed to said connecting member and comprising a sheet metal press fitting having one end thereof attached to said connecting member and comprising a substantially cylindrical portion and, at said other end thereof, an annular groove for housing an annular sealing member; said press fitting being dimensioned for receiving a substantially cylindrical conduit to be inserted therein and for non-releasably crimping said fitting around said conduit. Preferably, the connecting socket and the connecting member are firmly affixed by either a solder seam, a weld seam or a suitable adhesive. If, for example, the plumbing fixture is a valve, the connecting member is preferably constructed as an adapter comprising a flange for detachably connecting the valve to the connecting member, the press fitting and associated conduit.

The connection of the present invention permits the connecting element and the press fitting to be made from different materials as is further explained below. Preferably, the press fitting comprises an inwardly extending shoulder within the substantially cylindrical portion thereof thereby forming a stop for the conduit to be inserted therein. The press fitting is preferably dimensioned for a flush sliding fit into the connecting member.

One essential aspect of the connection of the present invention is that the connecting socket of the installation or plumbing element, whether it be a plumbing fixture or other shaped element, is formed from a standardized fitting element made of sheet metal which is firmly connected to the installation element by soldering, welding or bonding. The fitting element is provided, in known manner, with an end for receiving an annular packing or sealing ring and with a substantially cylindrical adjoining portion. The connection system of the present invention has the advantage that the installation element which because of its frequently complex geometry is difficult to produce, is made as a cast or molded part. In addition, by coupling the installation element with the standardized fitting element made from sheet metal, the element can be non-detachably connected to the pipe in a simple manner by pressing together or crimping. In this way, combinations of different materials such as, for instance, red brass with high-grade steel or sea water resistant copper-nickel forgeable alloy with high grade steel are possible in order to keep the number of different standardized fitting elements small. Titanium, which is particularly difficult to shape and therefore can not be considered as a suitable material in many cases, can also be used. Simple and workmanlike pressing together or crimping can also be performed with this combination without the danger that cracks appear in the area of the connection when critical materials are utilized for the installation element.

The stop which is necessary for the insertion of the pipe can, for example, be formed by a corresponding shoulder in the fitting element or by the end surface of the socket region of the installation element to be attached.

It is particularly preferable to provide the connection system of the present invention with a simple possibility for replacing a damaged or worn plumbing fixture. In this case, it is proposed in accordance with the present invention that the socket element be developed as adapter and be detachably connected to the plumbing fixture. In this way, the proven pressing system between socket and pipe can be retained and the damaged plumbing fixture can, nevertheless, be easily removed and replaced by a new one.

BRIEF DESCRIPTION OF THE DRAWINGS

The connection system of the present invention will be explained in further detail below with reference to the accompanying drawings in which:

FIG. 1 is a cross-sectional view through a first embodiment of the present invention;

FIG. 2 is the same as FIG. 1, but with a modified transition portion;

FIG. 3 is the same as FIG. 1, but showing a different embodiment of the stop; and FIG. 4 is a longitudinal sectional view through a plumbing fixture connection in accordance with the present invention.

DETAILED DESCRIPTION OF THE PRESENTLY PREFERRED EMBODIMENTS

FIG. 1 is a longitudinal cross-sectional view through a first embodiment of the pipe connection of the present invention. Any desired shaped element, such as an installation element or a plumbing fixture for a water and heating system is firmly attached to a standardized fitting element 2 made of sheet metal. The end of the fitting element or press fitting 2 is provided in known manner with an annular bead 3, within which an annular packing or sealing ring 4 is arranged. Adjoining the annular bead 3 on the other side, is a cylindrically shaped section 5 of the fitting element 2. The other end of the fitting element 2 is stepped down in such a manner that it forms a stop 7 for the inserted pipe 6. The point of connection between fitting element 2 and the shaped element 1 is formed, for instance, by a solder seam 8. However, a weld seam or an adhesive seam could also be used.

FIG. 2 is similar to FIG. 1, but with a different transition between fitting element 2 and shaped element 10. The transition is flush and the point or location of connection therebetween is formed, for instance, by a weld seam 9.

FIG. 3 shows, in the same longitudinal cross-sectional view as FIGS. 1 and 2, another embodiment of the connection of the present invention. In this case, the fitting element 12 does not have a shoulder in the cylindrical section 5, but the end surface 13 of the shaped element 11 forms the stop for the inserted pipe 6. The point of connection itself is again formed by a solder seam 8.

FIG. 4 shows the possibility of connecting a plumbing fixture, in this case, for instance, a valve 14, to the fitting element 2. The socket element connected with the fitting element is constructed here as an adapter so that the valve 14 can easily be replaced in case of damage or failure. On the left side of FIG. 4, the adapter is constructed as a threaded flange 15, while on the right side it is constructed as a clamped flange 16. The connection to the valve 14 is effected in the one case by screws 17 distributed preferably evenly about the circumference (left side) and, as an alternative, by means of a cap nut 18 (right side). The seal is assured by a packing ring 19, 20 which is arranged in the corresponding adapter 15, 16. The advantage of this system of connection is that the simple pressing or crimping of the fitting element together with the pipe 6 is retained and, furthermore, the valve 14 can easily be replaced.

It should be understood that the preferred embodiments and examples described are for illustrative purposes only and are not to be construed as limiting the scope of the present invention which is properly delineated only in the appended claims.

What is claimed is:

1. A fluid connection, comprising in combination:

a valve body made of a cast material, comprising an inlet and an outlet each having an end portion, each of said end portions being formed by a deformable sheet metal press fitting comprising a substantially cylindrical portion and an annular groove; and an annular sealing member disposed in said groove, and said press fitting being dimensioned for receiving a substantially cylindrical conduit to be inserted therein and for non-releasably crimping said fitting around said conduit, said inlet and said outlet each including a protruding annular sleeve having an outer surface receiving said press fittings and an end surface substantially perpendicular to said outer surface forming a stop for the conduit to be inserted therein.

2. The connection of claim 1, wherein said press fitting is affixed to each of said end portions by one of soldering, welding or adhesion.

3. The connection of claim 1, wherein said cast valve body and said press fitting are made from different materials.

4. The connection of claim 3, wherein said materials are selected from the group consisting of red brass, copper-nickel, alloy and high-grade steel.

5. A fluid connection, comprising:

a valve body including a connecting element of a cast material on the valve body; and a connecting socket comprising a sheet metal press fitting having a substantially cylindrical portion and, at one end thereof, a flange detachably connecting said socket to said connecting element and, at the other end thereof, an annular groove for housing an annular sealing member, said press fitting being dimensioned for receiving a substantially cylindrical conduit to be inserted therein and for non-releasably crimping said press fitting around said conduit.

6. The connecting of claim 5, wherein said cast connecting element and said press fitting are made from different materials.

7. The connection of claim 6, wherein said materials are selected from the group consisting of red brass, copper-nickel, alloy and high-grade steel.

8. The connection of claim 5, wherein said cast connecting element comprises a cap nut.

9. The connection of claim 5, wherein the press fitting additionally comprises a shoulder within said substantially cylindrical portion forming a stop for the conduit to be inserted.

10. The connection of claim 7, wherein said press fitting is dimensioned for a flush sliding fit into the connecting element.

\* \* \* \* \*